(12) United States Patent
Danner et al.

(10) Patent No.: US 6,952,800 B1
(45) Date of Patent: Oct. 4, 2005

(54) ARRANGEMENT FOR CONTROLLING AND LOGGING VOICE ENABLED WEB APPLICATIONS USING EXTENSIBLE MARKUP LANGUAGE DOCUMENTS

(75) Inventors: Ryan Alan Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/514,642

(22) Filed: Feb. 29, 2000

Related U.S. Application Data

(60) Provisional application No. 60/152,316, filed on Sep. 3, 1999.

(51) Int. Cl.[7] ............................................. G06F 15/00
(52) U.S. Cl. ...................................... 715/513; 715/522
(58) Field of Search ........................ 700/270; 715/513, 715/515, 516, 522

(56) References Cited

U.S. PATENT DOCUMENTS

| | | | |
|---|---|---|---|
| 4,837,798 A | | 6/1989 | Cohen et al. |
| 6,185,535 B1 * | | 2/2001 | Hedin et al. ................ 704/270 |
| 6,269,336 B1 * | | 7/2001 | Ladd et al. .................. 704/270 |
| 6,314,402 B1 * | | 11/2001 | Monaco et al. ............. 704/275 |
| 6,476,833 B1 * | | 11/2002 | Moshfeghi .................. 345/854 |
| 6,546,419 B1 * | | 4/2003 | Humpleman et al. ....... 709/223 |
| 6,584,466 B1 * | | 6/2003 | Serbinis et al. ............... 707/10 |
| 6,636,831 B1 * | | 10/2003 | Profit et al. .................. 704/275 |

OTHER PUBLICATIONS

BOS, "XML in 10 Points", W3.org (Aug. 26, 1999).

* cited by examiner

Primary Examiner—Stephen Hong
Assistant Examiner—Gregory J. Vaughn
(74) Attorney, Agent, or Firm—Leon R. Turkevich

(57) ABSTRACT

A unified web-based voice messaging system provides voice application control between a web browser and an application server via an hypertext transport protocol (HTTP) connection on an Internet Protocol (IP) network. The web browser receives an HTML page from the application server having an XML element that defines data for an audio operation to be performed by an executable audio resource. The application server executes the voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

32 Claims, 3 Drawing Sheets

Figure 4A

```
Sample Parameter File:

<SERVICES>
  <IMAP IP="10.10.0.255"
        hostname="imap1.domain.com"          ← 92a
        port="143"/>
  <LDAP IP="10.10.0.254"
        hostname="ldap1.domain.com"          ← 92b
        port="389"/>
  <TTS IP="10.10.0.253"
        hostname="texttospeech.domain.com"   ← 92c
        port="2525"/>
</SERVICES>
```
62

Figure 4B

```
Sample Log:
             74              76
<LOGFILE name="SesId_Log" application="appname">   ← 72
  <STANDARD date="xx-xx-xxxx" time="xx:xx:xx:xx">  ← 78a
    <RELEVANCE>BILLING,TRACE</RELEVANCE>  ← 82a       ← 80a
    <LOGCODE>12002</LOGCODE>
 84 <PARAMETERS>8045551234,8045551111</PARAMETERS>
    <TEXT>Call Made: 8045551111</TEXT>              ← 86a
  </STANDARD>
  <ERROR date="xx-xx-xxxx" time="xx:xx:xx:xx">  ← 78b
    <RELEVANCE>BILLING,TRACE,NOTIFY</RELEVANCE> ← 82b  ← 80b
    <LOGCODE>08042</LOGCODE>
 84 <PARAMETERS>8045551234,8045551111</PARAMETERS> ← 86b
    <TEXT>Outdial Request failure, no resource available</TEXT>
  </ERROR>
</LOGFILE>
```
70

ARRANGEMENT FOR CONTROLLING AND LOGGING VOICE ENABLED WEB APPLICATIONS USING EXTENSIBLE MARKUP LANGUAGE DOCUMENTS

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information.

One particular concern in the execution of voice-enabled web applications involves the logging of events that occur, during execution of the applications, into a log file and the ability to analyze the log file. Specifically, deployment of voice-enabled web applications in a commercial environment may require that the log file can be analyzed by various telephony management systems such as billing, monitoring, scripting, etc. However, existing methods of writing structured log files typically involves performing a "data dump" during an application operation with little or no structure to the data, rendering it difficult or impossible to effectively utilize the log data for voice enabled web applications. For example, conventional web servers have log facilities that are based on the logging of page or CGI information. The logging of the page or CGI information, however, is not sufficient for the management of voice enabled applications, since telephony management systems require more complex interaction, tracing, session reporting, and billing log information than generated by conventional web servers. Hence, the logging facilities of conventional web servers may prove inadequate to support the commercial deployment of voice-enabled web applications.

Another concern in the execution of voice-enabled web applications involves developing voice-enabled web applications using XML documents in a manner that provides sufficient flexibility for modification of the voice-enabled web applications with minimal changes to the XML documents defining the applications. In particular, care must be taken that the specificity of the XML documents defining the executable application do not limit the ability to easily modify the executable application.

SUMMARY OF THE INVENTION

There is a need for an arrangement that enables voice applications to be defined using extensible markup language (XML) documents in a manner that provides flexible control of the voice applications. In particular, there is a need for an arrangement that enables the modification of existing application parameters of a voice-enabled web application, or the addition of new application parameters, without affecting unmodified application parameters.

There is also a need for an arrangement that enables the generation of structured log files for voice-enabled web applications, where the structured log files can be analyzed using the structured nature of XML documents.

These and other needs are attained by the present invention, where control data for a voice-enabled web application, and log files that record events that occur during execution of the voice-enabled web application, are generated and processed using an XML tag format. The voice-enabled web application is defined, for example, using a first set of extensible markup language (XML) documents that define the voice application operations to be performed within the voice application. A second set of XML documents specify application parameters and control information to be used by the application runtime environment for execution of the first set of XML documents. The second set of XML documents enable the application parameters and control information to be stored separately from the first set of XML documents, eliminating the necessity for overly-specific XML documents to define a voice-enabled web application. In addition, the second set of XML documents enables the application server to maintain a generic application runtime environment, enabling applications to share common control information and provide personalized services for subscribers based on respective user specific control attributes.

The generation of log files using an XML tag format enables the log files to use a standardized XML structure that includes log element type, log element attribute, and log element data information. Hence, logs may be written for individual user sessions and overall application information, where the XML log tags may be of sufficient descriptive nature as to be understood using any XML viewer. Alternatively, the logs may be analyzed by custom log parser configured for locating prescribed XML tags related to a corresponding operation, for example billing, trace routing, etc. Hence, logging information can be more easily analyzed based on parsing the XML tags within the XML log documents.

One aspect of the present invention provides a method in an executable system for controlling execution of an executable voice application. The method includes storing an extensible markup language (XML) control document specifying at least one application control parameter for execution of the executable voice application in an application runtime environment generated by the executable system, and parsing the XML control document for execution of the executable voice application by the application runtime environment according to the at least one application control parameter.

Another aspect of the present invention provides a method in an executable system for generating a log file that specifies an occurrence of an event in response to execution of an executable voice application. The method includes generating an XML log document having a log entry that specifies the occurrence of the event in response to the execution of the executable voice application, the generating step including generating first, second and third XML tags specifying a log element type, a log element attribute, and a log element data for the event, respectively, and outputting the XML log document for storage on a tangible medium.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 4A and 4B are diagrams illustrating an XML control document and an XML log document, respectively.

BEST MODE FOR CARRYING OUT THE INVENTION

Figure 1:
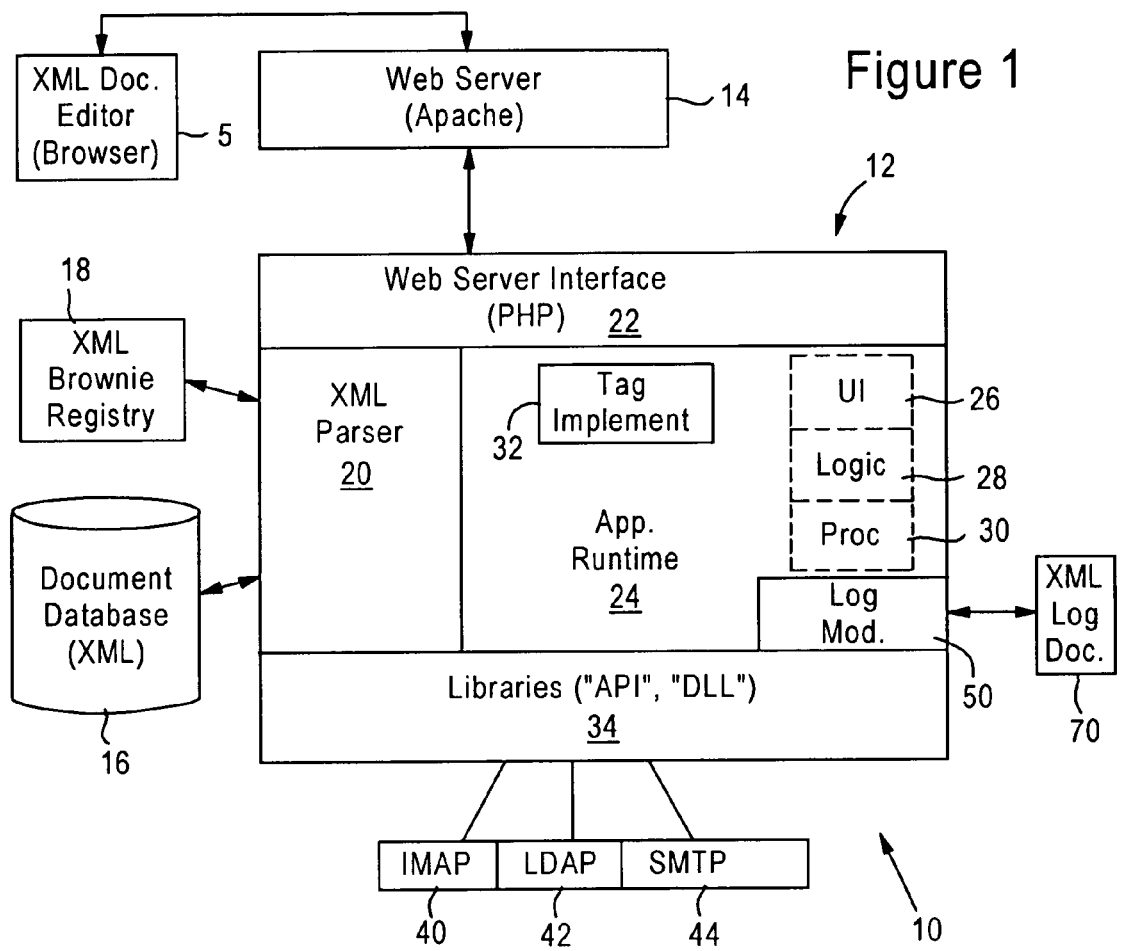
FIG. 1 is a block diagram illustrating in a system configured for the generation and usage of XML control documents and XML log documents during execution of voice applications according to an embodiment of the present invention.

The ability to provide unified voice messaging services via an IP network enables existing web servers on the World Wide Web or in corporate intranets to support telephone applications on a scalable and economic platform. Moreover, the use of XML documents in defining executable voice applications enables use of open standards that permits web programmers to use forms-based web programming techniques to design and implement voice telephone applications, without the necessity of programming using conventional programming languages. In addition, the use of XML documents in defining executable voice applications provides a structured application tool that enables a user to easily customize a voice application by making relatively minor changes to the XML documents. Additional details regarding the use of XML documents to define voice-enabled web applications is described in commonly-assigned, copending application Ser. No. 09/501,516, filed Feb. 9, 2000, entitled Arrangement for Defining and Processing Voice-Enabled Web Applications Using Extensible Markup Language Documents, the disclosure of which is incorporated in its entirety herein by reference.

The disclosed embodiment is directed to an arrangement for controlling execution of an executable voice application, and generating a log file that specifies an occurrence of an event in response to execution of the executable voice application, using extensible markup language (XML) documents. The structured nature of XML documents enables an application developer to provide structured flexibility to voice-enabled web applications, enabling the voice-enabled web applications to be easily modified even during execution in an application runtime environment.

The disclosed embodiment further enhances the ability to provide a structured model for the commercial deployment of voice-enabled web applications by providing a method in which web application control data and log output can be created and processed using an XML tag format. In particular, the disclosed embodiment provides extremely flexible control of a voice-enabled web application by separating application control parameters, stored in XML control documents, from application operations such as user interface operations, logic operations, and/or function operations. The separation of application control parameters from application operations by storing the application control parameters in separate XML documents enables new application control parameters to be added without affecting existing versions of the voice-enabled web application. In addition, existing application control parameters can be deleted without affecting future versions of the voice-enabled web application.

Moreover, the use of XML control documents to specify application control parameters facilitates the sharing of common control information between multiple voice-enabled web applications, since each voice-enabled web application does not need to rely on the control parameters to be specified in a specific state-dependent sequence. In addition, application control parameters can be described using the XML tag format, enabling user-specific control attributes to be specified within the XML control documents. Hence, a given XML control document may either be shared among multiple voice-enabled web applications for basic control parameters, or may be generated for a specific subscriber to store subscriber-specific application control parameters.

The disclosed embodiment also provides an arrangement for generating XML log documents, wherein each XML log document has at least one log entry that specifies an occurrence of an event in response to execution of the executable voice application. The storage of a log entry in XML format enables the use of the XML structure to define XML tags that specify log element types, log element attributes, and log element data information. The logs may be written for both individual sessions and overall application information. Moreover, the XML log tags are sufficiently descriptive that any XML viewer can be used to understand the log information. Alternatively, custom log parsers can be easily written, using standard XML editor tools, to gather and format log information relevant to a given operation, for example operations monitored by telephony management systems such as billing, monitoring, scripting, call processing management, or traffic management.

FIG. 1 is a block diagram illustrating a system configured for executing applications defined by XML documents based on application control parameters specified in XML control documents, and generating XML log documents for analysis according to an embodiment of the present invention. The system 10 includes an application server 12, a Web server 14, an XML document database 16, and an XML document registry 18. The XML document database 16 is configured for storing the XML documents that define the applications, and the XML control documents that specify application control parameters for execution of the executable voice applications. The XML document registry 18 is configured for storing XML documents that specify application state information for respective user sessions. The web server 14, for example an Apache server, receives HTTP requests from a client 5 via the Internet and forwards to the client HTML-based web pages dynamically generated by the application server 12. In particular, the application server 12 is configured for executing applications defined by stored XML documents, also referred to generally as web applications, in response to the HTML requests from the client. The application server 12 is implemented as a server executing a PHP hypertext processor with XML parsing and processing capabilities, available open source at the PHP website ("php.net").

Four types of XML documents are used by the application server 12 to execute web applications: menu documents, activity documents, decision documents, and "brownies". The menu documents, activity documents, and decision documents are XML documents, stored in the document database 16, that define user interface and boolean-type application logic for a web application, hence are considered "executable" by the application server 12. The brownie document, stored in the registry 18, is an XML data record used to specify application state and user attribute information for a given XML application during a user session.

Hence, the XML documents define user interface logistics and tie services and application server events together in a meaningful way, forming a coherent application or sets of applications.

The document database 16 also is configured for storing XML control documents that specify application control parameters for execution of the voice-enabled Web applications by the application server 12. The document database 16 may also be used for storage of XML log documents that specify the occurrence of events in response to execution of the voice-enabled web applications by the application server 12. The XML control documents, as well as the application-defining documents, can be created and edited by an XML document editor 5, for example a web browser having editing capabilities. In particular, the browser 5 may be provided a form-based menu generated by the application server 12; the user of the browser 5 completes the form, and posts the form back to a prescribed URL at the web server 14; the application server 12, in response to receiving the form having the prescribed URL, retrieves the information input to the posted form, and stores the retrieved information into an XML control document for storage in the document database 16.

The application server 12 includes an XML parser 20 configured for parsing the XML documents stored in the XML document database 16, for example the application-defining XML documents, the XML control documents, or the XML log documents. The XML parser 20 also is configured for parsing the XML documents (i.e., "brownies") stored in the registry 18 and configured for specifying the state and attributes for respective user sessions. The application server 12 also includes a high speed interface 22 that establishes a high-speed connection between the application server 12 and the web server 14. For example, the PHP hypertext processor includes a high-speed interface for Apache Web servers.

Figure 2:
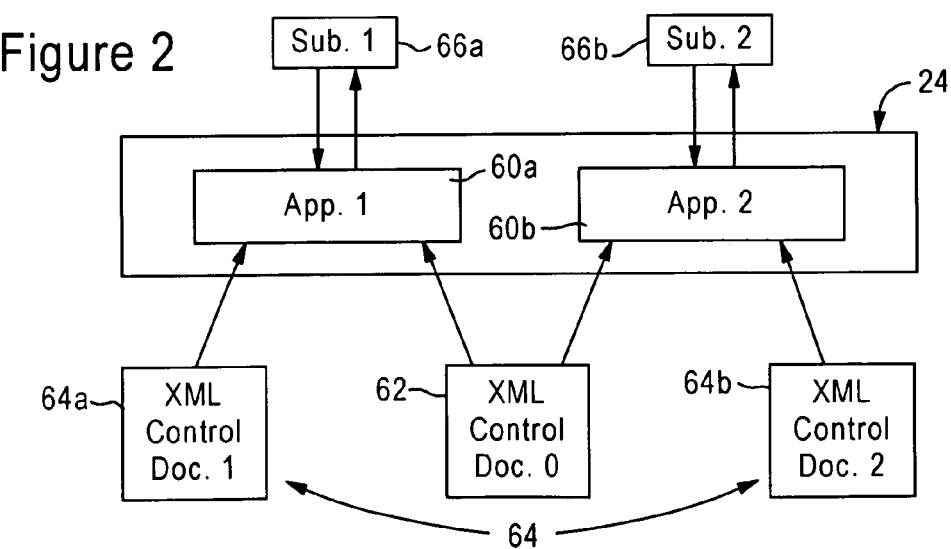
FIG. 2 is a diagram illustrating in further detail the application runtime environment of FIG. 1.

The application server 12 also includes a runtime environment 24 for execution of the parsed XML documents. FIG. 2 is a diagram illustrating in detail the application runtime environment 24 of FIG. 1, emphasizing the use of XML control documents to define application context. The application runtime environment 24 executes the voice-enabled web applications 60*a* and 60*b* by first parsing an XML control document 62 that specifies the necessary application control parameters for execution of the voice-enabled web applications 60*a* and 60*b*. Hence, the XML control document 62 provides basic runtime control defaults for the application runtime environment 24. In addition, the application runtime environment 24 may parse a second XML control file (e.g., 64*a*, 64*b*) that provides user-specific attributes overlying the basic control defaults specified in the XML control document 62. Hence, the application runtime environment 24 may parse a first XML control document 62 for basic runtime control defaults for the application runtime environment 24, followed by parsing of a second XML control document (e.g., 64*a*, 64*b*) for user-specific attributes for a corresponding subscriber (e.g., 66*a*, 66*b*). Hence, the application runtime environment 24 obtains basic runtime control defaults and user-specific attributes from stored XML control documents, enabling the stored XML control documents to provide context information to the application runtime environment 24. The context information is then used by the application runtime environment 24 for execution of the application-defining XML documents.

The runtime environment 24 parses the application-defining XML document for execution of the web application. As shown in FIG. 1, the runtime environment 24 may selectively execute any one of a user interface operation 26, a logic operation 28, or a procedure call 30 as specified by the parsed application-defining XML document by executing a corresponding set of executable functions based on the rule set for the corresponding operation and based on the context information obtained by the application runtime environment 24. In particular, the application runtime environment 24 includes a tag implementation module 32 that implements the XML tags parsed by the XML parser 20. The tag implementation module 32 performs relatively low-level operations based on the obtained context information, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 32 implements the tag operations that are specified within the XML framework of the stored XML documents. As described above, execution of the application operations by the runtime environment 24 is based on the control information from the parsed XML control documents, including basic runtime control defaults and/or user-specific attributes.

The application server also includes a log module 50 configured for generating an XML log document 70 for storage in the database 16. As described below, the log module 50 generates a log document for an event that occurred during execution of the voice-enabled web application in the application runtime environment, and generates XML tags that specify the type of event, the attribute of the event, and data for the event.

The application server 12 also includes a set of libraries 34 that may be implemented as dynamically linked libraries (DLLs) or application programming interface (API) libraries. The libraries 34 enable the runtime environment 24 to implement the procedures 30 as specified by the appropriate XML document. For example, the application server 12 may issue a function call to one of a plurality of IP protocol compliant remote resources 40, 42, or 44 according to IMAP protocol, LDAP Protocol, or SMTP protocol, respectively. For example, the PHP hypertext processor includes executable routines capable of accessing the IMAP or LDAP services. As described in further detail below, the application runtime environment 24 accesses the libraries 34 based on the context information obtained from the XML control documents.

Figure 3:
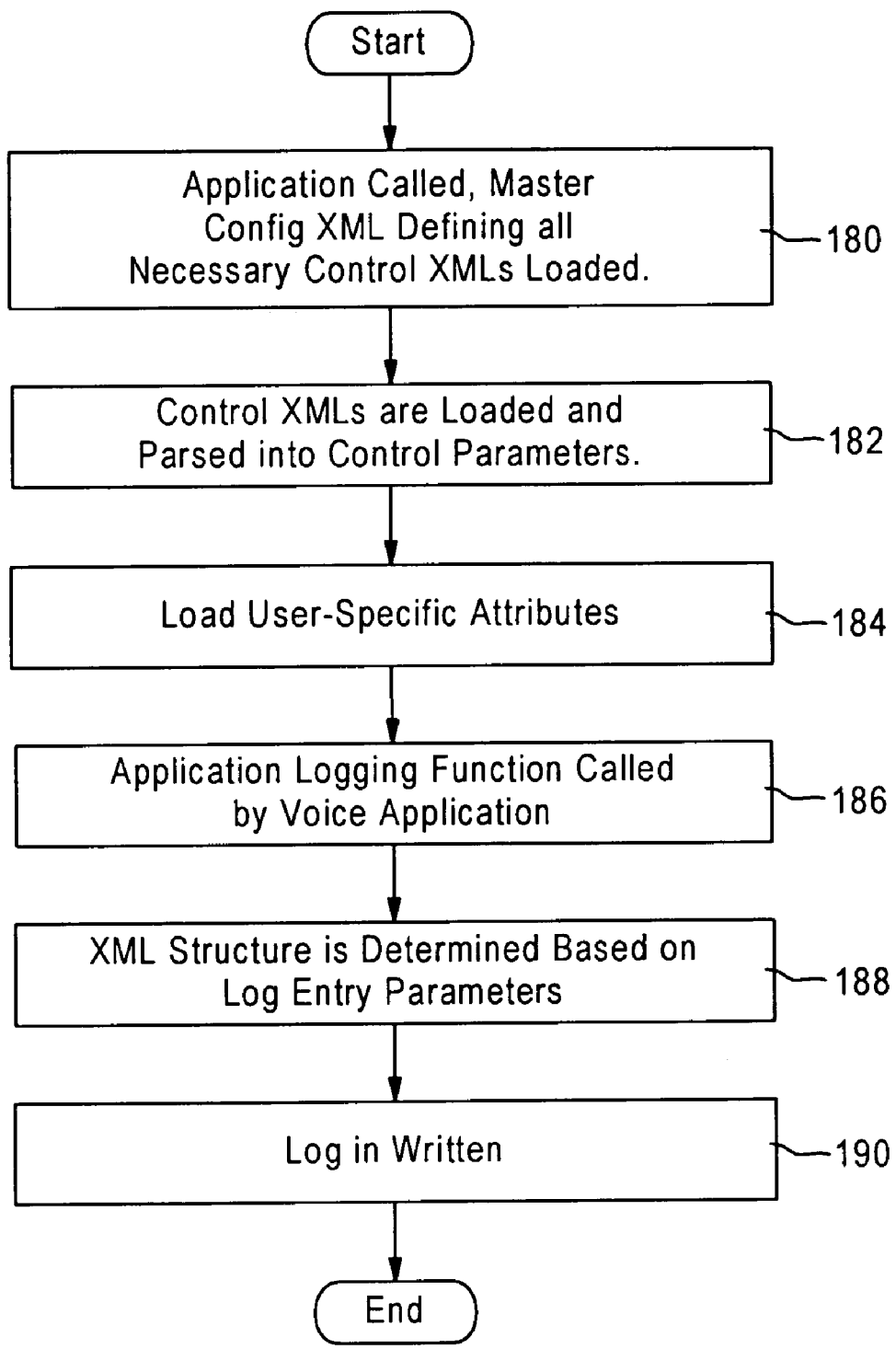
FIG. 3 is a flow diagram illustrating the method of controlling execution of an executable voice application and generating a log file according to an embodiment of the present invention.

FIG. 3 is a diagram illustrating a method of generating XML control documents and XML logging documents according to an embodiment of the present invention. The disclosed method can be implemented by a processor which executes instructions stored on a computer readable medium. FIG. 3 also illustrates the usage of XML control documents for execution of voice-enabled web applications by the application runtime environment 24. The method begins in step 180, where the application runtime environment 24 executes a master configuration XML document in the document database 16, that specifies all the necessary XML control documents needed for execution of voice-enabled web applications. As readily apparent from the foregoing, the master configuration XML document is generated by a user of the browser 5, using an XML document editor tool, to specify all necessary XML control documents 62. The application runtime environment 24 then loads each XML control document 62 specified in the master configuration XML document in step 182 and parses the loaded XML control document to obtain the control parameters.

FIG. 4A is a diagram illustrating an exemplary XML control document 62 having application control parameters for execution of a voice-enabled web application. The XML control document 62 includes XML tags that specify certain attributes of an application control parameter. For example, the XML control document 62 includes services tags 92*a*, 92*b* and 92*c* that specify service location information (e.g., IP address, host name, and port) necessary for the application runtime environment 24 to access IMAP, LDAP, and text-to-speech services, respectively.

The application runtime environment 24, upon loading the XML control documents in step 182, obtains the necessary context information for execution of the application-defining XML documents in response to user requests. If desired, the application runtime environment 24 may also be configured for accessing user-specific attributes in step 184: in this case, the application runtime environment 24 accesses the corresponding user-specific XML control document 64 in response to receiving a request from the subscriber to the voice-enabled web application to obtain the user-specific context information. Hence, the XML control documents 62 can be considered a basic level of control information necessary for execution of a voice-enabled web application; the user-specific XML control documents 64 can be considered the next higher-level of control information necessary for execution of a voice-enabled web application for a corresponding subscriber, and the application-defining XML documents can be considered the highest level of abstraction with respect to execution of the voice-enabled web applications by the application runtime environment 24.

Use of the XML control documents 62 and 64 provides additional flexibility for an application developer to develop voice-enabled web applications. For example, the application developer may use specific elements for searching the LDAP database 42 (e.g., "billing number" or "subscriber ID"), however the application developer may wish to remove the attribute names from the actual database so that the routine can still be implemented using another database system. Use of an XML control file enables the application developer to specify the internal name for the search attribute, and the implemented name for the alternative database system. Hence, use of the XML control documents 62 and/or 64 provides substantial flexibility enabling application developers to easily modify application behavior as necessary.

During execution of the application-defining XML documents based on the XML control documents 62 and 64, the application runtime environment 24 calls a logging function in the log module 50 in step 186 in response to parsing a prescribed XML tag, within one of the application-defining XML documents, that specifies a logging operation. The log module 50 generates the XML log document 70 in step 188 based on the log entry parameters that may be specified in the application-defining XML documents, and stores the log document 70 in the document database 16 in step 190.

FIG. 4B is a diagram illustrating a sample log file 70 generated by the log module 50 in step 188. The log file 70 includes a log file tag 72 that specifies a name attribute 74 and an application attribute 76 that specifies the application having generated the log file 70 during execution by the application runtime environment 24. The log file 70 also includes log entry tags 78a and 78b that specify a standard log entry 80a and an error log entry 80b, respectively. Each log entry (e.g., 80a, 80b) includes a relevance tag (e.g., 82a, 82b) that specifies a log element type (e.g., BILLING, TRACE, NOTIFY) for the corresponding log entry (e.g., 80a, 80b): in other words, the relevance tag 82a specifies the log element types BILLING and TRACE, indicating that the log entry 80a is relevant for billing information and trace information. Hence, the log file 70 can be parsed by the XML parser 20 during execution of an analysis routine configured for locating log entries related to billing information, trace information, or the like. Consequently, the analysis routine can quickly identify XML log documents 70 that are relevant for the analysis under consideration.

The sample log file 70 also includes a log code XML tag 84 that specifies a prescribed log code based on a log code index. In particular, the log code may be referenced to a log code index that is used by the application runtime environment 24 to correlate the log code to the corresponding event. The sample log file 70 also includes additional tags 86a, 86b (e.g., PARAMETERS, TEXT) that specify the log element data. Hence, the structure nature of the log file 70 in XML format enables the log data to be more highly structured, such that the log file 70 can be parsed during execution of an analysis application configured for reviewing log files for selected log data; the analysis application can determine whether data is relevant based on the corresponding relevance tags (e.g., 82a, 82b) such that nonrelevant data can be ignored based on the corresponding XML tag. In addition, logs may be written for both individual subscriber sessions and overall application information. The logging tags are descriptive enough to understand the log information using any XML viewer, although a custom log parser can be written using standard XML parsing functions to gather and format the log information.

A particular feature of using XML documents for execution of voice-enabled web applications is that the application runtime environment 24 does not maintain a persistent state, but rather executes a prescribed application operation, sends media information back to the subscriber in the form of an HTML-based web page via the Web server 14, and then returns to a restful state. Hence, a user of the editor 5 can concurrently edit application control parameters for an XML control document 62 or 64 while conducting a subscriber session with the application server 12. In particular, the application server 12 merely performs an operation in the application runtime environment to respond to a subscriber request and then returns to a restful state, although the browser 5 provides the user the appearance that a voice-enabled web application and the editing of XML control documents can occur simultaneously. Hence, the use of XML for defining the control documents and the application-defining XML documents is particularly effective in providing the appearance of real time execution, enabling a programmer to instantaneously check an input value for debugging purposes.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an executable system for controlling execution of an executable voice application, the method comprising:

storing an extensible markup language (XML) control document specifying at least one shared application control parameter specifying basic control defaults for execution of the executable voice application in an application runtime environment generated by the executable system;

parsing the XML control document for execution of the executable voice application by the application runtime environment according to the at least one shared application control parameter;

controlling execution of a first instance of the executable voice application for a first subscriber, by the application runtime environment, based on parsing a corresponding first user-specific XML control document specifying user-specific application control parameters overlying the basic control defaults specified in the shared application control parameter; and controlling execution of a second instance of the executable voice application for a second subscriber, by the application runtime environment and concurrent with execution of the first instance, based on parsing a corresponding second user-specific XML control document specifying user-specific application control parameters overlying the basic control defaults specified in the shared application control parameter.

2. The method of claim 1, wherein the storing step includes first generating a first XML tag that specifies, for the corresponding at least one shared application control parameter, service location information for accessing a first prescribed service by the executable voice application.

3. The method of claim 2, wherein the storing step further includes second generating a second XML tag that specifies, for a second corresponding shared application control parameter, service location information for accessing a second prescribed service by the executable voice application.

4. The method of claim 3, wherein the first and second prescribed services are IMAP and LDAP services, respectively.

5. The method of claim 1, further comprising generating an XML log document having a log entry that specifies an occurrence of an event in response to the execution of the executable voice application.

6. The method of claim 5, wherein the step of generating the XML log document includes generating first, second and third XML tags specifying a log element type, a log element attribute, and log element data for the event, respectively.

7. The method of claim 5, wherein the step of generating the XML log document further includes generating a first XML tag to specify at least the log element type from a plurality of available log element types.

8. The method of claim 1, wherein the steps of controlling the execution of the first and second instances each include the application runtime environment terminating the corresponding instance in response to the corresponding instance having output a web page having media information for the corresponding subscriber.

9. A system configured for controlling execution of a voice application, the system including:
   a computer-based system configured for generating a shared extensible markup language (XML) control document, for controlling execution of the voice application, that specifies a corresponding shared application control parameter specifying basic control defaults for execution of the executable voice application in an application runtime environment, the computer-based system including an application server configured for generating the application runtime environment for execution of the voice application based on parsing the shared XML control document; and
   a storage medium configured for storing the XML control document for parsing in the application runtime environment;
   wherein the computer-based system is configured for generating a plurality of user-specific XML control documents for respective subscribers, the application server configured for concurrently executing the voice application for first and second of the subscribers based on parsing respective selected first and second of the XML control documents, each of the first and second XML control documents specifying at least one corresponding user-specific application control parameter overlying the basic control defaults specified in the shared application control parameter.

10. The system of claim 9, wherein the computer-based system is further configured for generating an XML log document having a log entry that specifies an occurrence of an event in response to the execution of the executable voice application.

11. The system of claim 10, wherein the computer-based system generates the log entry by generating first, second and third XML tags specifying a log element type, a log element attribute, and log element data for the event, respectively.

12. The system of claim 11, wherein the computer-based system generates the first XML tag to specify at least the log element type from a plurality of available log element types.

13. The system of claim 9, wherein the computer-based system generates for the shared XML control document a first XML tag that specifies, for the corresponding application control parameter, service location information for accessing a first prescribed service by the executable voice application.

14. The system of claim 13, wherein the computer-based system further generates for the shared XML control document a second XML tag that specifies, for a second corresponding application control parameter, service location information for accessing a second prescribed service by the executable voice application.

15. The system of claim 14, wherein the first and second prescribed services are IMAP and LDAP services, respectively.

16. The system of claim 9, wherein the application runtime environment is configured for terminating the corresponding voice application for one of the first and second subscribers in response to the corresponding voice application having output a web page having media information for the corresponding subscriber.

17. A computer readable medium having stored thereon sequences of instructions for controlling execution of a voice application by an executable system, the sequences of instructions including instructions for performing the steps of:
   storing an extensible markup language (XML) control document specifying at least one shared application control parameter specifying basic control defaults for execution of the executable voice application in an application runtime environment generated by the executable system;
   parsing the XML control document for execution of the executable voice application by the application runtime environment according to the at least one shared application control parameter;
   controlling execution of a first instance of the executable voice application for a first subscriber, by the application runtime environment, based on parsing a corresponding first user-specific XML control document specifying user-specific application control parameters overlying the basic control defaults specified in the shared application control parameter; and
   controlling execution of a second instance of the executable voice application for a second subscriber, by the application runtime environment and concurrent with execution of the first instance, based on parsing a corresponding second user-specific XML control document specifying user-specific application control parameters overlying the basic control defaults specified in the shared application control parameter.

18. The medium of claim 17, wherein the storing step includes first generating a first XML tag that specifies, for the corresponding at least one shared application control parameter, service location information for accessing a first prescribed service by the executable voice application.

19. The medium of claim 18, wherein the storing step further includes second generating a second XML tag that specifies, for a second corresponding shared application control parameter, service location information for accessing a second prescribed service by the executable voice application.

20. The medium of claim 19, wherein the first and second prescribed services are IMAP and LDAP services, respectively.

21. The medium of claim 17, further comprising instructions for performing the step of generating an XML log document having a log entry that specifies an occurrence of an event in response to the execution of the executable voice application.

22. The medium of claim 21, wherein the step of generating the XML log document includes generating first, second and third XML tags specifying a log element type, a log element attribute, and log element data for the event, respectively.

23. The medium of claim 21, wherein the step of generating the XML log document further includes generating a first XML tag to specify at least the log element type from a plurality of available log element types.

24. The medium of claim 17, wherein the steps of controlling the execution of the first and second instances each include the application runtime environment terminating the corresponding instance in response to the corresponding instance having output a web page having media information for the corresponding subscriber.

25. A system for controlling execution of an executable voice application, the system comprising:
   means for storing an extensible markup language (XML) control document specifying at least one shared application control parameter specifying basic control defaults for execution of the executable voice application in an application runtime environment generated by the executable system;
   means for parsing the XML control document for execution of the executable voice application according to the at least one shared application control parameter;
   means for controlling execution of a first instance of the executable voice application for a first subscriber, by the application runtime environment, based on the means for parsing having parsed a corresponding first user-specific XML control document specifying user-specific application control parameters overlying the basic control defaults specified in the shared application control parameter;
   the means for controlling execution further configured for controlling execution of a second instance of the executable voice application for a second subscriber, concurrent with execution of the first instance, based on the means for parsing having parsed a corresponding second user-specific XML control document specifying user-specific application control parameters overlying the basic control defaults specified in the shared application control parameter.

26. The system of claim 25, wherein the storing means is configured for generating a first XML tag that specifies, for the corresponding at least one shared application control parameter, service location information for accessing a first prescribed service by the executable voice application.

27. The system of claim 26, wherein the storing means is configured for generating a second XML tag that specifies, for a second corresponding shared application control parameter, service location information for accessing a second prescribed service by the executable voice application.

28. The system of claim 27, wherein the first and second prescribed services are IMAP and LDAP services, respectively.

29. The system of claim 25, further comprising means for generating an XML log document having a log entry that specifies an occurrence of an event in response to the execution of the executable voice application.

30. The system of claim 29, wherein the generating means is configured for generating first, second and third XML tags specifying a log element type, a log element attribute, and log element data for the event, respectively.

31. The system of claim 29, wherein the generating means is configured for generating a first XML tag to specify at least the log element type from a plurality of available log element types.

32. The system of claim 25, wherein the means for controlling execution is configured for terminating a corresponding instance in response to the corresponding instance having output a web page having media information for the corresponding subscriber.

* * * * *